(12) United States Patent
Gurevich et al.

(10) Patent No.: US 11,105,898 B2
(45) Date of Patent: Aug. 31, 2021

(54) ADAPTIVE ILLUMINATION SYSTEM FOR 3D-TIME OF FLIGHT SENSOR

(71) Applicant: SYMBOL TECHNOLOGIES, LLC, Lincolnshire, IL (US)

(72) Inventors: Vladimir Gurevich, Great Neck, NY (US); Peter Fazekas, Bayport, NY (US); David T. Shi, Setauket, NY (US)

(73) Assignee: Symbol Technologies, LLC, Holtsville, NY (US)

(*) Notice: Subject to any disclaimer, the term of this patent is extended or adjusted under 35 U.S.C. 154(b) by 602 days.

(21) Appl. No.: 15/858,433

(22) Filed: Dec. 29, 2017

(65) Prior Publication Data
US 2019/0204421 A1  Jul. 4, 2019

(51) Int. Cl.
*G01S 7/48* (2006.01)
*G01S 7/481* (2006.01)
*B65D 90/48* (2006.01)
*G01S 17/86* (2020.01)
*G01S 17/894* (2020.01)

(52) U.S. Cl.
CPC ............ *G01S 7/4815* (2013.01); *B65D 90/48* (2013.01); *G01S 17/86* (2020.01); *G01S 17/894* (2020.01); *G01S 7/4808* (2013.01)

(58) Field of Classification Search
CPC ........ G01S 7/4815; G01S 17/86; G01S 17/89; G01S 7/4808; B65D 90/48
See application file for complete search history.

(56) References Cited

U.S. PATENT DOCUMENTS

| | | | |
|---|---|---|---|
| 2004/0066500 A1 | 4/2004 | Gokturk et al. | |
| 2004/0179209 A1* | 9/2004 | Besch | H05K 13/081 356/614 |
| 2007/0075853 A1 | 4/2007 | Griffin et al. | |
| 2009/0185141 A1 | 7/2009 | Chen et al. | |
| 2010/0018257 A1 | 1/2010 | Chang | |
| 2011/0304840 A1* | 12/2011 | Hsu | G01C 3/10 356/4.03 |
| 2012/0154785 A1* | 6/2012 | Gilliland | G01S 17/931 356/5.01 |
| 2012/0154786 A1* | 6/2012 | Gosch | G01S 7/487 356/5.01 |
| 2013/0199300 A1* | 8/2013 | Abe | G01N 29/2418 73/655 |

(Continued)

FOREIGN PATENT DOCUMENTS

| | | |
|---|---|---|
| TW | 201000882 A | 1/2010 |
| WO | 2016/184844 A1 | 11/2016 |
| WO | 2018/091970 A1 | 5/2018 |

OTHER PUBLICATIONS

Combined Search and Examination for Great Britain Patent Application No. GB1820613.6 dated Jun. 7, 2019.

(Continued)

*Primary Examiner* — James R Hulka
(74) *Attorney, Agent, or Firm* — Yuri Astvatsaturov (57) ABSTRACT

A system and method for adaptively illuminating a volume with an illumination system that illuminates a volume of interest using separately controllable near field and far field optimized illumination sources, to maintain an irradiance pattern criteria in the volume, where that criteria may be different for a far field portion of the volume than for a near field portion of the volume.

14 Claims, 10 Drawing Sheets

(56) References Cited

U.S. PATENT DOCUMENTS

2016/0239792 A1 8/2016 Burch, V et al.
2016/0377260 A1* 12/2016 Choi ..................... F21S 43/31
  362/297
2019/0018106 A1* 1/2019 Skowronek ............. G01S 17/66

OTHER PUBLICATIONS

Preliminary Search for Polish Patent Application No. 428313 dated Jun. 19, 2019.

* cited by examiner

PRIOR ART

ADAPTIVE ILLUMINATION SYSTEM FOR 3D-TIME OF FLIGHT SENSOR

BACKGROUND OF THE INVENTION

Three-dimensional (3D) sensors are used to measure loads within vehicle trailers and shipping containers. 3D sensors, for example, measure distances from a back-wall of a trailer/container to the nearest load-wall inside that trailer/container. From these distances, operators can determine such metrics as the available storage space within a volume Current 3D sensors are structured light (SL) 3D sensors used in Trailer Monitor Units (TMUs) mounted on vehicle trailers. For SL sensors, a projector projects an image into a volume (of the trailer/container), multiple cameras capture renditions of the projected image, and these renditions are image processed to determine relative distances of the back wall and objects in the volume. The process requires complex and time-consuming image processing, and the results are often inaccurate. Specifically, SL sensors are highly dependent on the light intensity in a volume. Yet, light intensity changes dramatically with the number of objects in the volume, or when differently shaped or differently sized objects are placed in the volume. The result is that conventional 3D sensors are of limited effectiveness in "smart" shipping application, where accurate assessment of trailer loads is desired. Additionally, accurate assessment of trailer loads is hampered by different vehicle trailer sizes and differing irradiance conditions that can result in a trailer. Without consistent and sufficient lighting in a trailer, conventional 3D sensors may measure distal regions and proximal regions of a vehicle trailer with different levels of accuracy. Furthermore, different loads within the vehicle trailer may have different reflective properties, making for varying irradiance conditions in the trailer, which can further affect the accuracy of 3D sensors.

Accordingly, there is a need for a system of illuminating a volume with an illumination pattern that maintains sufficient irradiance within a volume for accurate measurements of objects within the volume, while maintaining a maximum irradiance that provides safe operation of personnel within the volume. There is further need for a system of illuminating a volume that allows for variable control over the illumination pattern over different regions of a volume to promote more accurate 3D sensor measurements.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As described herein, the embodiments of the present disclosure are directed to techniques for illuminating a volume with an adaptive illumination control of varying illumination pattern sources to maintain illumination irradiances for sufficient on and off axis illumination of objects throughout both near field and far field regions within a volume, such as a vehicle trailer or shipping container.

In some implementations, an illumination system includes multiple sources of illumination. For example, the illumination system may include a plurality of different light source and diffuser pairs. Each pair may be positioned at a proximal end of a volume. That volume may be a shipping trailer, such as vehicle trailer, or a shipping container, or some other volume within which multiple objects for shipping may be placed. Each pair may be configured to generate a different diffused photon beam that is configured to more optimally illuminate a different region of the volume. Toward that end, each pair may contain a respective electrically controllable light source and a respective diffuser. It is noted that the electrically controllable light source feeding any diffuser may be multiple light sources, such as multiple lower powered lasers combining to from one electrically controllable light source feading a diffuser. The pairs may be configured to collectively illuminate an illumination volume extending from a distal end plane of the vehicle trailer volume to an interstitial plane in the vehicle trailer volume. In some implementations, at least one pair is configured to more optimally illuminate a far field region. That pair is termed a far field light source and diffuser pair. Further, at least one pair is configured to more optimally illuminate a near field region; and that pair is termed a near field light source and diffuser pair. A controller is electrically connected to the far field light source and diffuser pair and to the near field light source and diffuser pair. That controller may be configured to adjust output illumination intensity levels of one or both of these pairs, as well as other pairs if they are included in the system. Such adjustability results in the ability of the illumination system to adapt illumination in the volume in response to changes, such as in response to changes in position of an interstitial plane within the volume.

In some implementations, the near field light source and diffuser pair contain a diffuser configured to maintain an output illumination intensity according to a uniform diffusion relationship. An example uniform diffuser would be a cosine off-angle diffuser, although other uniform diffusers may be used for the near field light source. In some implementations, the far field light source and diffuser pair contain a diffuser configured to maintain a non-uniform output illumination intensity for producing a desired maximum irradiation at a lateral extent of a distal end plane, such as a distal back wall of a trailer volume. In some implementations, a controller is configured to reduce the output illumination intensity level of the far field light source and diffuser pair in response to an interstitial plane moving further away from the distal plane, e.g., with a load wall in trailer moving closer to the illumination source, while maintain the output illumination intensity level of the near field light source and diffuser pair.

Figure 1:
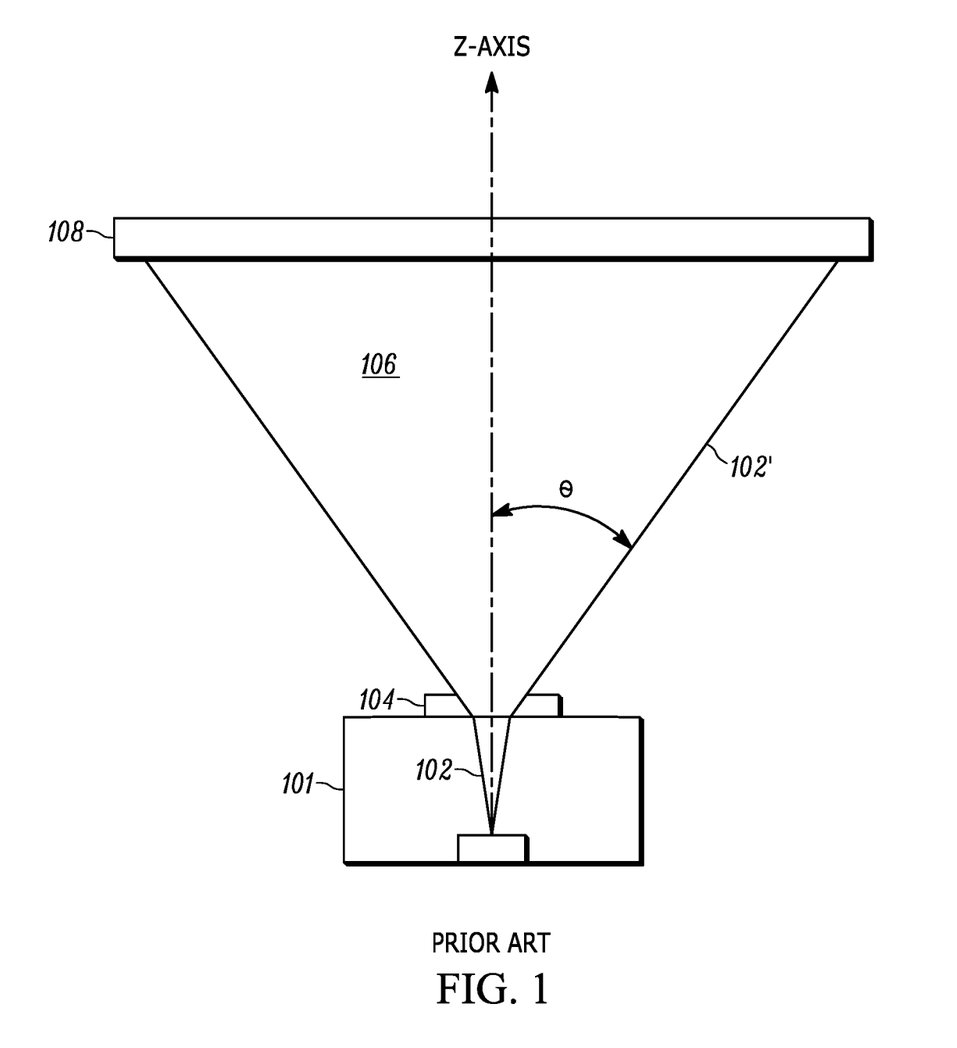
FIG. 1 is a schematic illustration of a prior art illumination system.

FIG. 1 is a diagram of a conventional illumination system 100, as used for 3D sensors such as those used in video game environments. A light source 101, which is commonly a laser light source, produces an output beam 102, while a diffuser 104 (within or external to a light source housing 103) receives that output beam and converts it to an affected output beam 102' that evenly displaces the beam over solid angle volume 106, thereby forming a uniform irradiance of a flat screen 108. Such a conventional configuration is useful for gaming applications, which are short-range applications. The uniform irradiance at the screen 108 is important to optimize detection of an object in the solid angle volume 106. For example, as a gaming controller is moved anywhere within the volume, the 3D sensor can detect the gaming controller with the same accuracy. This uniformity is achievable, in part, because over the short distances of gaming applications, e.g., 5 m or shorter, the 3D sensor can operate effectively without use of a high intensity light out.

Unfortunately, configurations like that of FIG. 1 are not useful for large volume applications, e.g., volumes that extend greater that 5 m from the light source, and certainly not where personnel operate within the volume. The intensity of light required to maintain the uniform irradiance flat screen would be above established safe limits of laser output illumination intensity, when extended to a large volume.

Figure 2A:
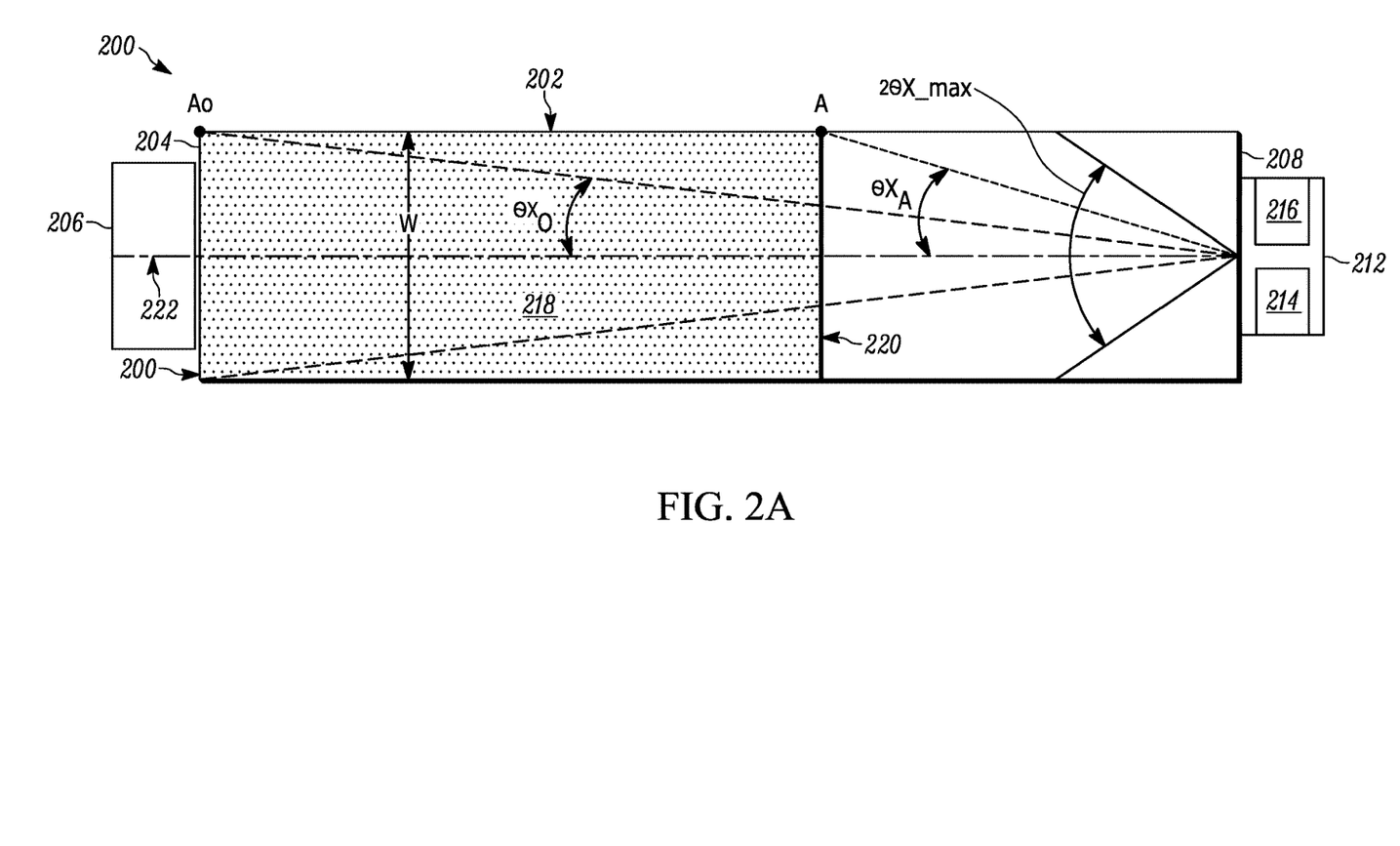
FIGS. 2A and 2B are example schematic illustrations of a top view and a side view, respectively, of a vehicle trailer with an example adaptive illumination system producing an example illumination pattern, in accordance with some embodiments.
Figure 2B:
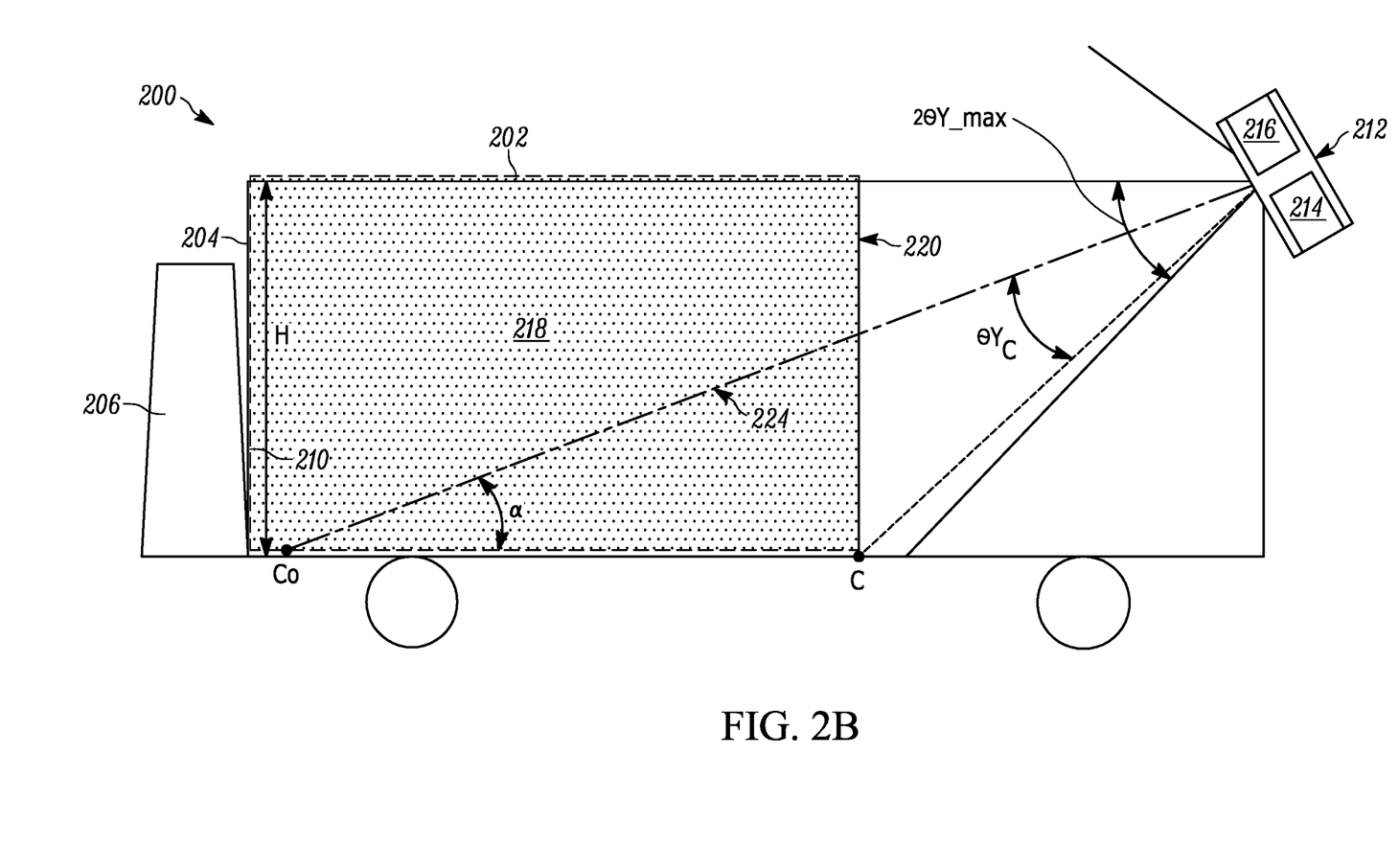

FIGS. 2A and 2B illustrate a schematic of an illumination system environment 200 in accordance with various example embodiments herein. FIG. 2A illustrates a top view of the illumination system environment 200, and FIG. 2B illustrates a side view.

The environment 200 may be implemented in trailer-based vehicle shipping application, as shown. In the illustrated example, the environment 200 includes a vehicle trailer 202 having a distal end 204, nearest to a vehicle cab 206, and a proximal end 208, at which personnel typically will access the trailer 202 by loading/offload objects for/from shipping.

For loading the vehicle trailer 202, typically personnel will access the proximal end 208 carrying objects onto a bed of the vehicle trailer 202, for example, using a forklift or other container carrier. In some examples, autonomous vehicles may be used to carry objects into the vehicle trailer 202. Initial objects are typically loaded against a back wall (at a distal end plane) 210 of the vehicle trailer 202, and subsequent objects are loaded until some or all of the back wall 210 is covered with objects. Objects will continue to be placed within the vehicle trailer 202 until a shipping volume within the vehicle trailer 202 is completed.

For applications such as 3D sensor measurements, to ensure proper illumination over the shipping volume within the vehicle trailer 202, the environment 200 further includes an adaptive illumination system 212 positioned at the proximal end 208. The adaptive illumination system 212 comprises a plurality of light source and diffuser pairs (two of which are shown 214 and 216) that each generate an output beam that provided into the volume of the vehicle trailer 202. The first pair 214 may contain one or more laser light sources 215, one or more light emitting diodes (LEDs), a combination thereof, or other suitable light source. The first pair 214 may further include one or more diffusers 217 positioned to receive an output beam from the light source 215 and diffuse that output beam, in accordance with examples herein. Similarly, the second pair 216 includes a light source 219 and a diffuser 221 positioned to receive an output beam from the light source 219 and diffuse that output beam, in accordance with examples herein. As discussed further herein, the first pair 214 and the second pair 216 may have light sources and/or diffusers of differing properties. For example, the first pair 214 may be configured to more optimally illuminate a far field region of the vehicle trailer 212, e.g., a region that encompasses the back wall 210. The second pair 216 may be configured to more optimally illuminate a near field region of the vehicle trailer 212, e.g., a region that encompasses an interstitial plane 220. The term "more optimally" as used herein references that a light source and diffuser pair may be configured to produce an output beam that is designed to satisfy an illumination condition (or irradiance condition) defined for a particular region of the vehicle trailer 212. Even if multiple pairs produce output beams that are combined to illuminate a region within the vehicle trailer, one of those pairs may still be designed to satisfy an illumination condition over that region, while the other pairs, while still affecting illumination over that region, may or may not be designed to satisfy an illumination condition over that region.

The adaptive illumination system 212, with the combined output from pairs 214 and 216, is configured to illuminate an illumination volume 218 within the vehicle trailer 202, where that illumination volume 218 extends from the back wall 210 to an interstitial plane 220 located between the distal end 204 and the proximal end 208. The interstitial plane 220 is marked with the points "A" and "C" in FIGS. 2A and 2B, respectively, where point "A" indicates a lateral off-axis extent of the interstitial plane 220, from an illumination x-axis 222, indicated by an off-axis angle, $\theta_x$. The point "C" indicates another lateral off-axis extent of the interstitial plane 220, from an illumination y-axis 224, indicated by off-axis angle, $\theta_y$. In a similar manner, at the back wall 210, a lateral off-axis extent is indicated by the point "$A_O$" measured from the illumination x-axis 222, and a lateral off-axis extent indicated by the point "$C_O$" measured from the illumination y-axis 224.

In the illustrated example, the adaptive illumination system 212 is configured to provide an output beam with an illumination intensive pattern that illuminates the volume 218, where that illumination pattern meets particular pattern criteria, and where the criteria are based on obtaining a desired irradiance over an illumination volume that extends from the back wall 20 to the interstitial plane 220. In the illustrated example, the volume 218 is formed of a far field region 223 and a near field region 225. The illumination pattern criteria may be specific to or both of these regions.

In some embodiments, a first illumination intensity criterion is that the adaptive illumination system 212 be configured to maximize irradiance of the vehicle trailer 202, in particular at the back wall 210 (maximum back wall irradiance), while maintaining that irradiance (and thus the illumination intensity from the light source) at or below prescribed safety levels for personnel. This criteria is an example far field pattern criteria. Various examples of safety levels may be used to define the maximum back wall irradiance. An example safety level for a laser light source is to have a maximum illumination intensity from the laser source as set forth in the requirements of Class 1 for lasers, defined by 21 Code of Federal Regulations 1040 (21 C.F.R. 1040) in the United States, or as set forth internationally by the International Electrotechnical Commission (EIC) under regular EIC 60825. Either of these may be considered as defining a maximum permissible accessible emission limit. Another example far field pattern criteria is to have uniform irradiance across the back wall 210 (i.e., against the distal plane). It is noted that while these and other criteria may be characterized in terms of their affect within a region of the volume, to generate that affect these criteria have corresponding criteria for the illumination intensity of the output beam of the respective pair generating the output beam. For example, the far field pair 214 may be configured to satisfy a first far field criteria by having the diffuser 217 produce a non-uniform irradiance across the back wall 210. An example diffuser to produce such a pattern would be a diffuser that produces a higher irradiance in a central region of a diverging illuminating beam as compared to the irradiance at the lateral extent of the illuminating beam. An example non-uniform diffuser may by a Gaussian diffuser.

In some embodiments, a second illumination intensity criterion is to maintain an off-axis extent irradiance of the interstitial plane 220 (i.e., at points "A" and/or "C") at or above a minimum irradiance established at the back wall. This criteria is an example near field pattern criteria. Another near field pattern criteria is to maintain a uniform irradiance at an interstitial plane, load wall, that is sufficiently close to the light source and diffuser pair. An example diffuser providing a uniform irradiance would be a cosine diffuser.

While other design criteria may be established, the far field and near field pattern criteria, it has been found, allow for suitably strong irradiances at the back wall 210, while maintaining a minimum useful irradiance over the entire illumination volume 218, including over the entire depth and lateral extent, such that the entire illumination volume 218 is sufficiently illuminated for time of flight 3D sensor measurements.

In some implementations, each pair 214 and 216 has a different pattern criteria. In some implementations, including the examples described in reference to FIG. 2, each pair 214 and 216 has a pattern criteria that corresponds to a different region of the volume 218. That need not be the case in all implementations, however, as in some examples, pairs have different pattern criteria that correspond to the same region. Further still, an adaptive illumination system may use more than two pairs, such that some pairs may not have any pattern criteria or such that multiple pairs have the same pattern criteria.

Figure 3:
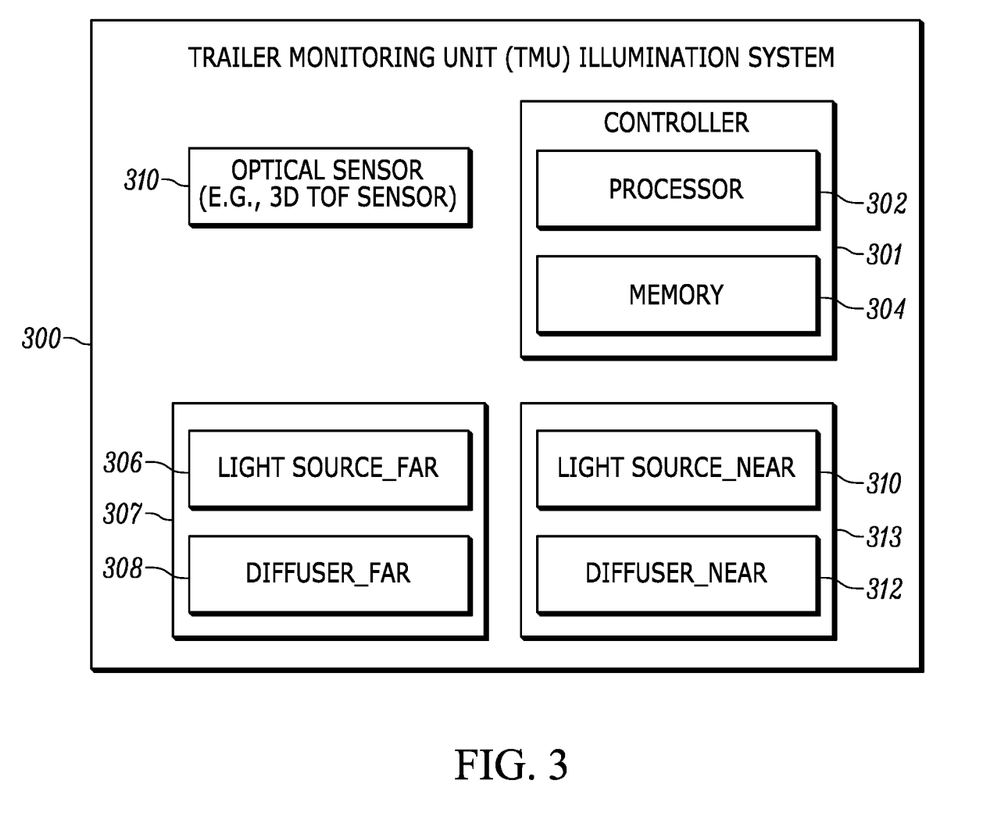
FIG. 3 is a schematic of an example adaptive illumination system having a far field illumination system and a near field illumination system, in accordance with some embodiments.

FIG. 3 illustrates an example implementation of an adaptive illumination system, such as the illumination system 212, formed as trailer monitoring unit configured to satisfy the aforementioned illumination pattern criteria. Adaptive illumination system 300 includes a controller 301 that includes a processor 302 and memory 304 configured to perform any of the functions described herein. The adaptive illumination system 300 includes a far field light source 306 and a far field diffuser 308, forming a far field pair 307. The diffuser 308 is positioned to receive an output beam from the light source 306 and alter that beam to produce a desired illumination pattern projected into the vehicle trailer 202, where that desired pattern is more optimally directed to the far field region of an illumination volume. The adaptive illumination system 300 includes a near field light source 310 and a near field diffuser 312, forming a near field pair 313. The diffuser 312 is positioned to receive an output beam from the light source 310 and alter that beam to produce a desired illumination pattern projected into the vehicle trailer 202, where that desired pattern is more optimally directed to the near field region of an illumination volume.

In some embodiments, the processor 302 is communicatively coupled to the light sources 306 and 310 to control their operation and in particular to adaptively adjust the amount of light intensity output by each of the light sources. In some embodiments, the diffusers 308 and 312 may be static elements configured to produce their respective desired illumination patterns. The diffusers 308 and 312 may be thin film structures or bulk structures, flexible structures or rigid structures, by way of example. In other embodiments, one or more of the diffusers 308 and 312 may be dynamic elements that can be changed to produce different illumination patterns under different conditions. In some such embodiments, the diffusers 308 and 312 may be an electronically-controlled elements, e.g., electronically-controlled light shaping diffusers available from Luminit of Torrance, Calif., that are communicatively coupled to the processor 302 for controlling which illumination pattern is generated by the diffusers 308 and 312. The adaptive illumination system 300 further includes an optical sensor 310 communicatively coupled to the processor 302 for performing time-of-flight measurements and other functions, as described herein.

To satisfy the illumination intensity criteria, in various embodiments, the diffusers 308 and 312 may be configured to produce an illumination intensity as follows.

The illumination intensity of the output beam from the adaptive illumination system 300 is indicated by $I(\theta)$, where $\theta$ is measured from a central (illumination) axis where the illumination intensity is highest and where output beam produces the highest irradiance at any plane within the volume (i.e., where the illumination axis interest that plane). $I(\theta)$ may be a function of $I_{FAR}(\theta)$ and $I_{NEAR}(\theta)$, as follows $I(\theta)=I_{FAR}(\theta)+I_{NEAR}(\theta)$, where $I_{FAR}(\theta)$ is the output beam intensity from the far field pair 307 and $I_{NEAR}(\theta)$ is the output beam intensity from the near field pair 313.

In various examples, to maximize the illumination intensity $I_{max}(\theta)$ of the output beam, and more specifically to maximize irradiance at the back wall 210 (see, FIGS. 2A and 2B) within the limits of eye safety defined under Class 1, the pairs 307 and 313 may be configured to satisfy standard EIC EN60825-1:2014, in which the accessible emission limit (AEL) is expressed in terms of radiation power within a 7 mm diameter detector (maximum size of eye pupil) at 100 mm from the diffuser surface (closest eye accommodation distance). AEL limits radiation intensity (power per solid angle) of illumination source Imax:

$$I_{max} = \frac{AEL}{\pi 3.5 \text{ mm}^2 \over 100 \text{ mm}^2} \quad (1)$$

The AEL is linearly proportional to angular size of the laser spot on diffuser as seen from 100 mm distance. When the viewing angle (between eye sight and diffuser normal) θ increases, angular spot size decreases. Therefore, AEL is a function of the viewing angle θ to the diffuser. A conservative estimation of EIC EN60825-1:2014 was applied, such that AEL was treated as proportional to cosine angle θ, resulting in an expression of the maximum illumination intensity, per angle, of the diffused output beam:

$$I_{max}(\theta) \propto \cos(\theta) \quad (2)$$

This relationship contrasts with conventional distribution, like of FIG. 1, in which the radiation intensity increased with angle θ to ensure uniform irradiance at the distal plane.

Therefore, in some embodiments, the pairs 307 and 313 are configured to maximize illumination intensity, I(θ), (and thus irradiance) at the back wall 210, according to the follow condition:

$$I(\theta) \leq I_{max}(\theta) = I_O \cos(\theta) \quad (3)$$

where Io is the on-axis illumination intensity, i.e., at θ=0. The expression (3) provides the illumination intensity that is to be maintained over a range of off-axis angles whether in the x-direction (horizontal illumination intensity) or in the y-direction (vertical illumination intensity). In the example of the x-direction, and considering irradiance at the back wall, i.e., $I_x(\theta)$, the suitable angles, as defined in FIGS. 2A and 2B, are such that $-\theta_{x0} < \theta_x < \theta_{x0}$ and $\theta_y < 0$. In the example of the y-direction, i.e., $I_y(\theta)$, the suitable angles are such that $-\theta_{y0} < \theta_y < \theta_{y0}$. Of course, these illumination intensity expressions are satisfied for any angle, θ, for light illuminating an illumination volume, that is, $-\theta_{xA} < \theta_x < \theta_{xA}$ and $\theta_y < 0$ for the interstitial plane along the x-axis and $-\theta_{yC} < \theta_y < \theta_{yC}$ for the interstitial plane along the y-axis. The maximum allowable angles of $\theta_{xA}$ and $\theta_{yA}$ will depend on the diffuser and are shown by $\theta_{x\_max}$ and $\theta_{y\_max}$, in the illustrated example. These maximum angles also determine the nearest position of the interstitial plane to the proximal end, and thus the maximum angles define the maximum size of the illumination volume measured from the back wall.

The pairs 307 and 313 may be further configured to produce a combined output beam with an illumination intensity criteria, $I_{min}(\theta)$, that minimizes off-axis irradiance over the illumination volume. In some embodiments, that means that the irradiance at the interstitial wall (also termed a load wall), at the sides and bottom of the vehicle trailer 202, should not fall below the irradiance at the back wall 210. That is, a consistent minimum irradiance should be maintained over the entire illumination volume 218, for example.

In other words, and as shown in the top view (FIG. 2A), the irradiance at the off-axis extent of the interstitial plane 220, i.e., at point "A," should be equal to or larger than irradiance at the back wall 210 at the corresponding off-axis extent (point "$A_O$").

To determine the conditions of the pairs 307 and 313 (and their diffusers 308 and 312) for satisfying a minimum condition, irradiance, Ea, at the point "A" is defined. For the x-direction, the irradiance, Ea, as function of vehicle trailer width, W, angle $\theta_x$, and source illumination intensity $I(\theta_x)$, is expressed as follows:

$$E_a(\theta_x) = \frac{I(\theta_x)\cos(\theta_x)}{\left[\frac{.5W}{\sin(\theta_x)}\right]^2} \quad (4)$$

Ea should not decrease with angle θx. Therefore, Ea can be expressed as:

$$E_a(\theta_x) \geq E_a(\theta_{x0}), \text{ where } \theta_x \geq \theta_{x0} = \text{atan}\left(\frac{.5W}{L}\right) \quad (5)$$

where L is the length of back wall to the illumination system 212, e.g., the length of the vehicle trailer.

From expression (5), we obtain the following expression (6) of the horizontal intensity that the illumination pattern from the diffuser 308 is to follow, in various embodiments:

$$I_x(\theta_x) \geq I_{x\_min}(\theta_x) = I_x(\theta_{x0})\frac{\cos(\theta_{x0})\sin(\theta_{x0})^2}{\cos(\theta_x)\sin(\theta_x)^2} \quad (6)$$

Similarly, from the side view of the vehicle trailer 202 (FIG. 2B), irradiance, Ec, of a bottom of the interstation plane 220 (at point C) should be equal to or larger than irradiance of at point "$C_O$" at the back wall. From that similar condition, we determine a vertical intensity that the illumination patter from the diffuser 308 is to follow, in various embodiments as expression (7):

$$I_y(\theta_y) \geq I_{y\_min}(\theta_y) = I_y(\theta_{y0})\frac{\cos(\alpha)\sin(\alpha)^2}{\cos(\alpha+\theta_y)\sin(\alpha+\theta_y)^2} \quad (7)$$

where α is the tilt of the illumination system mounted at a proximal end of a vehicle trailer, as shown by way of example in FIG. 2B.

These expressions (6) and (7) describe minimum illumination intensity criteria along horizontal and vertical planes, as established by the combined output of the pairs 307 and 313, to achieve the desired irradiance over the illumination volume. Similar expressions can be derived for other irradiance conditions, as desired, to make sure that irradiance at or near the corners of the interstation plane 220 does not fall below the irradiance at or the corners of the back wall 210 of the vehicle trailer. This helps ensure proper illumination of these extremes.

Figure 4:
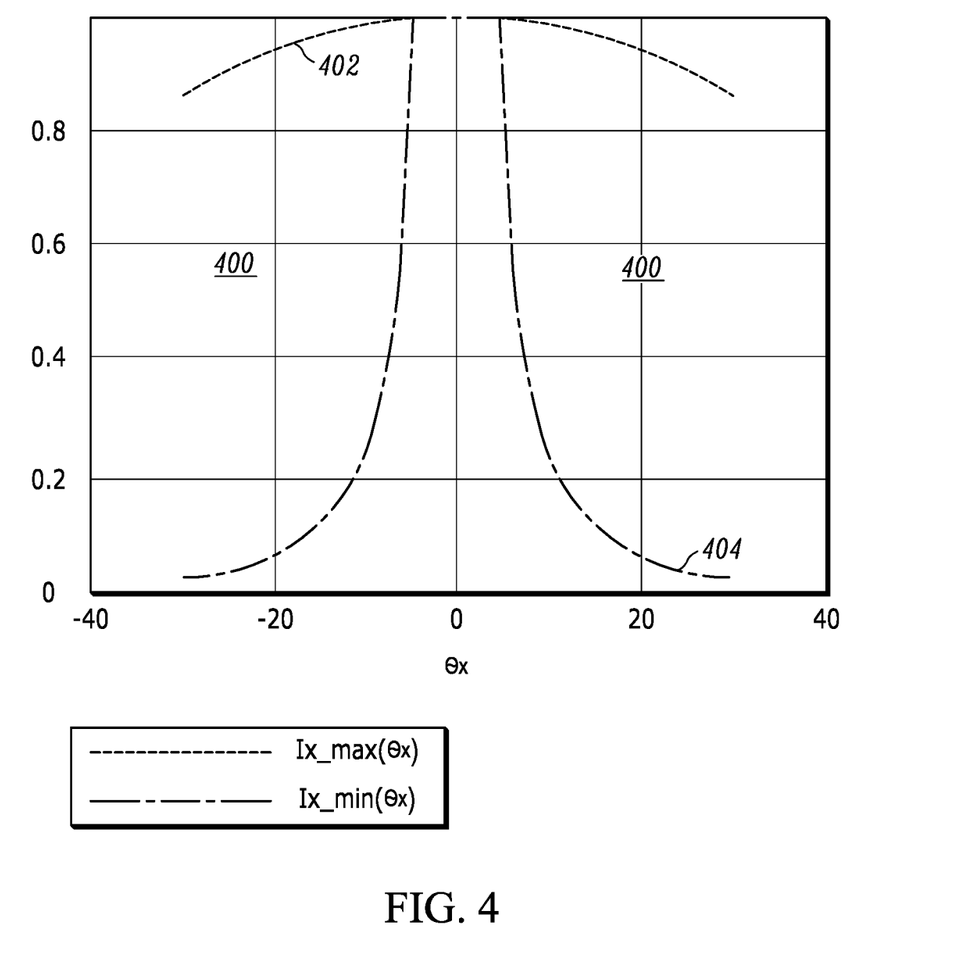
FIG. 4 is an illustration of an example illumination pattern criterion, in accordance with some embodiments.

FIG. 4 is an illustration of an intensity acceptability region 400 for a horizontal illumination intensity of an output beam emitted into a vehicle trailer, as determined by the illumination system in accordance with various embodiments. The acceptability region 400 is bounded, at the upper end, by a maximum illumination intensity curve 402 and, at the lower end, by a minimum illumination intensity curve 404. In the illustrated example, the curves 402 and 404 were determined from the example expressions (3) and (6). It will be appreciated, however, that these expressions are merely examples, and that other expressions (or illumination intensity criteria) may be used to determine the maximum curve 402 and minimum curve 404. While FIG. 4 illustrates an acceptability region for a horizontal illumination intensity, a similar profile would exist for a vertical illumination intensity, except that in the illustrated example the pairs are positioned to produce a combined output beam at an angle relative to longitudinal y-axis. Furthermore, while the illustration is that of intensity, an acceptability region of irradiance may be also be defined, and would have a similar profile, albeit as a measure of irradiance as a function of off-axis angle.

Figure 5A:
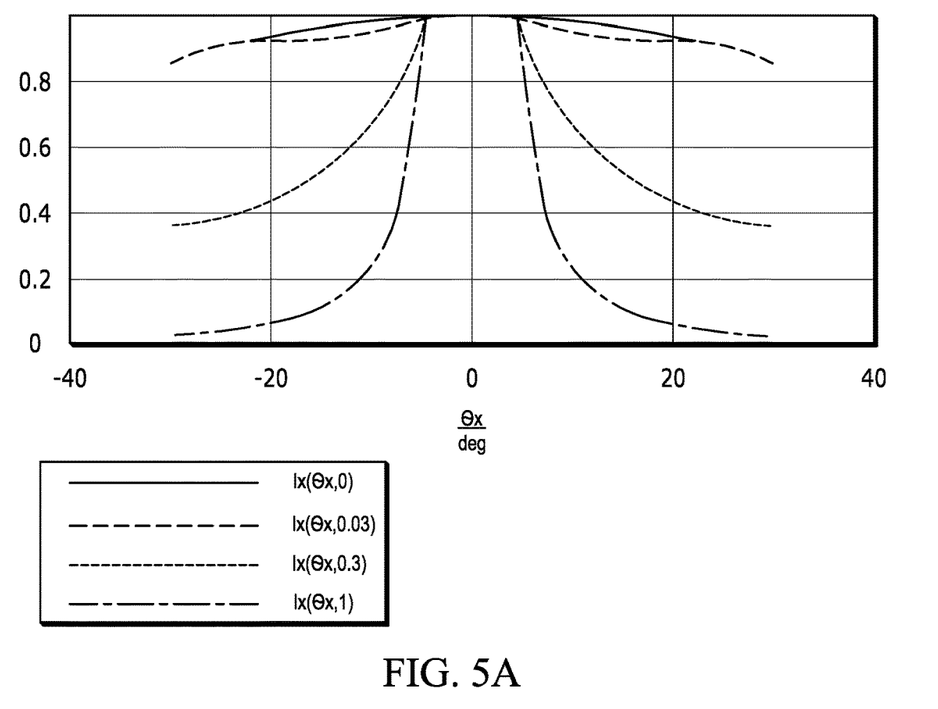
FIGS. 5A and 5B are further examples illumination pattern criteria, with varying shape factors, in accordance with some embodiments.
Figure 5B:
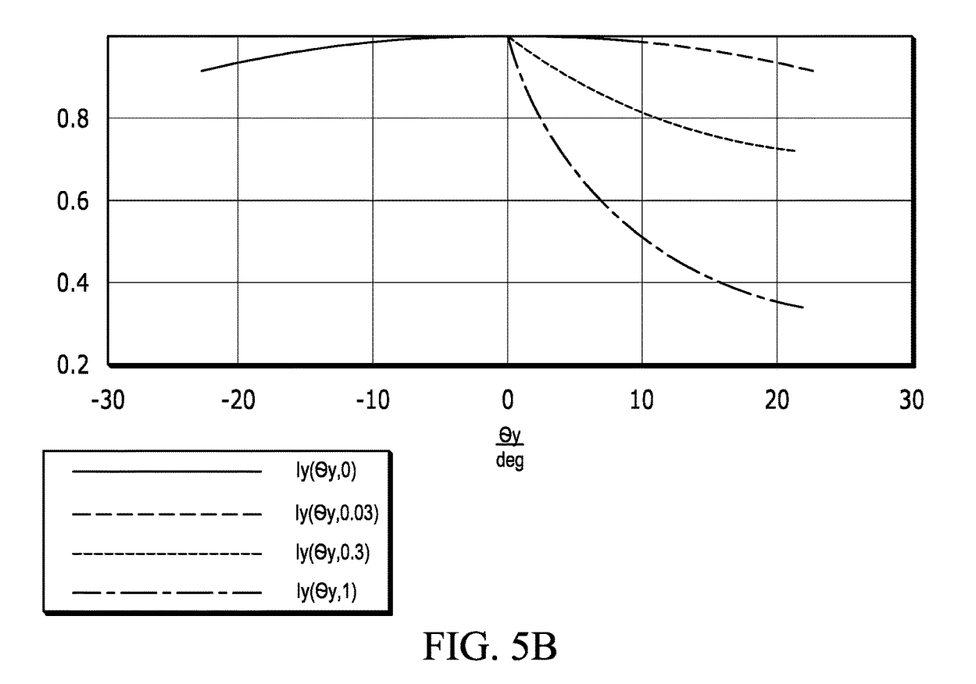

FIGS. 5A and 5B illustrate a plurality of example intensity acceptability regions, each determined by a design criterion factor and each of which may be used for more general scenarios of some embodiments herein. FIG. 5A illustrates illumination intensity acceptability regions for a horizontal illumination intensity of an output beam emitted into a vehicle trailer. FIG. 5B illustrates illumination intensity acceptability regions for vertical illumination intensity of that output beam. In comparison to expressions (6) and (7), the illumination pattern criteria for the acceptability regions in FIGS. 5A and 5B satisfy the following expressions:

$$I_x(\theta_x, kx) := \min\left[\cos(\theta_x), \left(\frac{\cos(\theta_{x0})\sin(\theta_{x0})^2}{\cos(\theta_x)\sin(\theta_x)^2}\right)^{kx}\right] \quad (8)$$

$$I_y(\theta_y, ky) := \text{if } \theta_y < 0, \cos(\theta_y), \quad (9)$$
$$\min\left[\cos(\theta_y), \left(\frac{\cos(\alpha)\sin(\alpha)^2}{\cos(\theta_y + \alpha)\sin(\theta_y + \alpha)^2}\right)^{ky}\right]$$

$$I(\theta_x, \theta_y, kx, ky) := I_x(\theta_x, kx)I_y(\theta_y, ky) \quad (10)$$

where like definitions to that of FIGS. 2A and 2B are used here. In contrast to the expressions (6) and (7), the expressions (8) and (9) each depend on an additional design criterion, shape factor, expressed as kx for the horizontal axis shape factor and ky for the vertical axis shape factor.

The shape factor, k, is used to further define the resulting illumination intensity generated by a diffuser. The shape factor can range from 0 to 1. When the shape factor k=1, the result is a minimum illumination intensity, as shown in FIGS. 5A and 5B. In FIG. 5A, for example, the smallest minimum intensity curve 602 corresponds to a shape factor k=1, while the largest maximum intensity curve 604 corresponds to a shape factor of 0. Thus expression (8) can singularly define the minimum and maximum horizontal illumination intensity conditions, by virtue of having different shape factors. The same is true for expression (9) regarding vertical illumination intensity conditions. The shape factor, k, is a variable that can be used to trade off efficient of illumination of a back wall versus non-uniformity of intensity as an interstitial plane with the vehicle trailer.

In configurations in which the diffuser is electronically controllable, a processor may be programed to adjust the shape factor to a desired value for the particular vehicle trailer to be illuminated. Vehicle trailer variables, such as length, width, and height may be used by the processor to determine a desired shape factor, which is then used to determine a diffusion profile for the diffusor. The processor may then communicate the desired diffusion profile to the diffusor.

Figure 6:
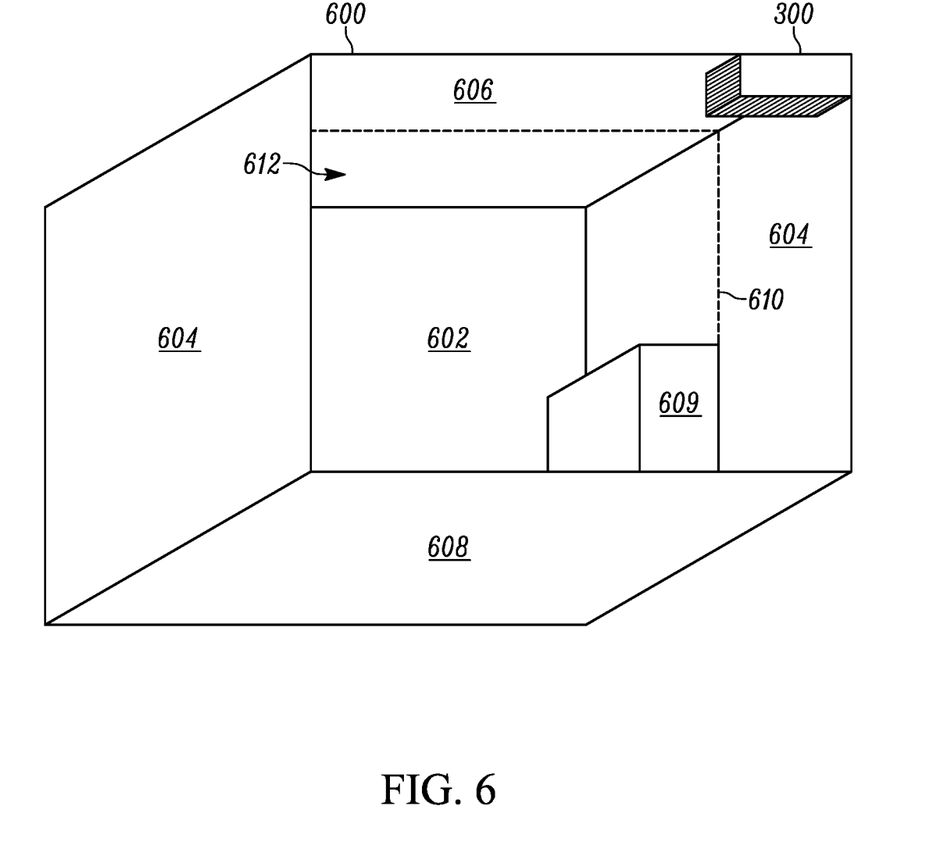
FIG. 6 illustrates another example vehicle trailer having an adaptive illumination system like that of FIG. 3 used for time-of-flight sensing applications, in accordance with some embodiments.

Returning to FIG. 3, the adaptive illumination system 300 may be used for time-of-flight 3D sensor measurements with a vehicle trailer, an example of which is described in relation to FIG. 6. These time-of-flight measurements may be used to identify objects within the vehicle trailer, to identify an interstitial plane corresponding to the nearest object in the vehicle trailer, to determine a consumed volume within a vehicle trailer, to determine an available volume within the vehicle trailer, to determine dimensions of objects with the trailer, and/or other applications.

In some time-of-flight embodiments, the light sources 306 and 310 are infrared laser sources and the optical sensor 310 is a time-of-flight 3D image sensor configured to measure infrared light reflected (i.e., radiance) from within a vehicle trailer 600, e.g., off a back wall and off of objects in the vehicle trailer. In some embodiments, the processor 302 controls the light sources 306 and 310 and the diffusers 308 and 312 to produce a combined illumination output beam having a desired illumination intensity pattern over the far field region and another desired illumination intensity pattern of the near field region. The processor 302 controls the optical sensor 310 to then collect infrared image data from within the vehicle trailer and analyze that image data, either within the optical sensor 310 or within the processor 302, to determine 3D image data, from which the various characteristic values can be determined for the vehicle trailer and objects therein. In this way, the adaptive illumination system 300 can determine a location of a back wall 602 of the vehicle trailer 600, as well as locations of side walls 604, top wall 606, and bottom wall 608. From there, the adaptive illumination system 300 can determine the overall volume of the vehicle trailer 600. In the example of a TOF sensor, the optical sensor 310 may determine location based on the time of flight of light hitting the optical sensor after illumination from the light sources 306 and/or 310 and them impinging a back wall or interstitial wall (e.g., one or more objects in a trailer), and then reflecting and imping the TOF sensor.

The adaptive illumination system 300 can also determine a location of a closest object 609 within the vehicle trailer 600, from which the adaptive illumination system 300 can identify the location of an interstitial plane 610. From there, the adaptive illumination system 300 can determine, by applying the techniques herein, an illumination volume 612 and the illumination pattern needed to satisfy illumination criteria (and/or irradiance criteria) stored within the memory 304.

In some examples, the optical sensor 310 may be configured at an auto-exposure monitoring sensor. In such examples, the optical sensor 310 may have an automatically adjusting light exposure meter. As the interstitial plane 610 (e.g., load wall) gets closer to a proximal end of the trailer, the optical sensor 310 may apply an auto-exposure to maintain measured irradiance on the optical sensor 310, despite the intensity of the reflect irradiance increasing. The optical sensor 310 may adjust, for example, a shutter speed (or aperture size) of the optical sensor 310, making a shutter open/close at a faster amount of time as the intensity of light increases, so as to maintain a consistent exposure reading on the optical sensor 310. That adjustment may continue until the optical sensor 310 determines that a threshold condition has been met, such as that the optical sensor 310 is applying a shutter of a given threshold speed (or in other examples a threshold aperture). When that threshold condition is met, the optical sensor 310 may instruct the controller 301 to control the pairs 307 and 313 to provide different output levels, for example, switching off the pair 307.

To achieve desired illumination throughout the illumination volume, the far field and near field illumination sources may both, simultaneously illuminate the volume. However, when performing 3D time-of-flight (TOF) measurements within that illumination volume, such as measuring load and available load capacity within a vehicle trailer, the irradiance levels measured by 3D time-of-flight sensors may be affected by the amount of light within the volume. In particular, as the interstitial plane, indicating the location of the closest load within the volume, moves closer to the 3D TOF sensors, the amount of irradiance reflected from a load will increase with the square of the distance. To compensate for such changes in irradiance within the volume, a controller is used to selectively adjust the output illumination intensity of one or more of the far field and near field illumination sources.

Figure 7:
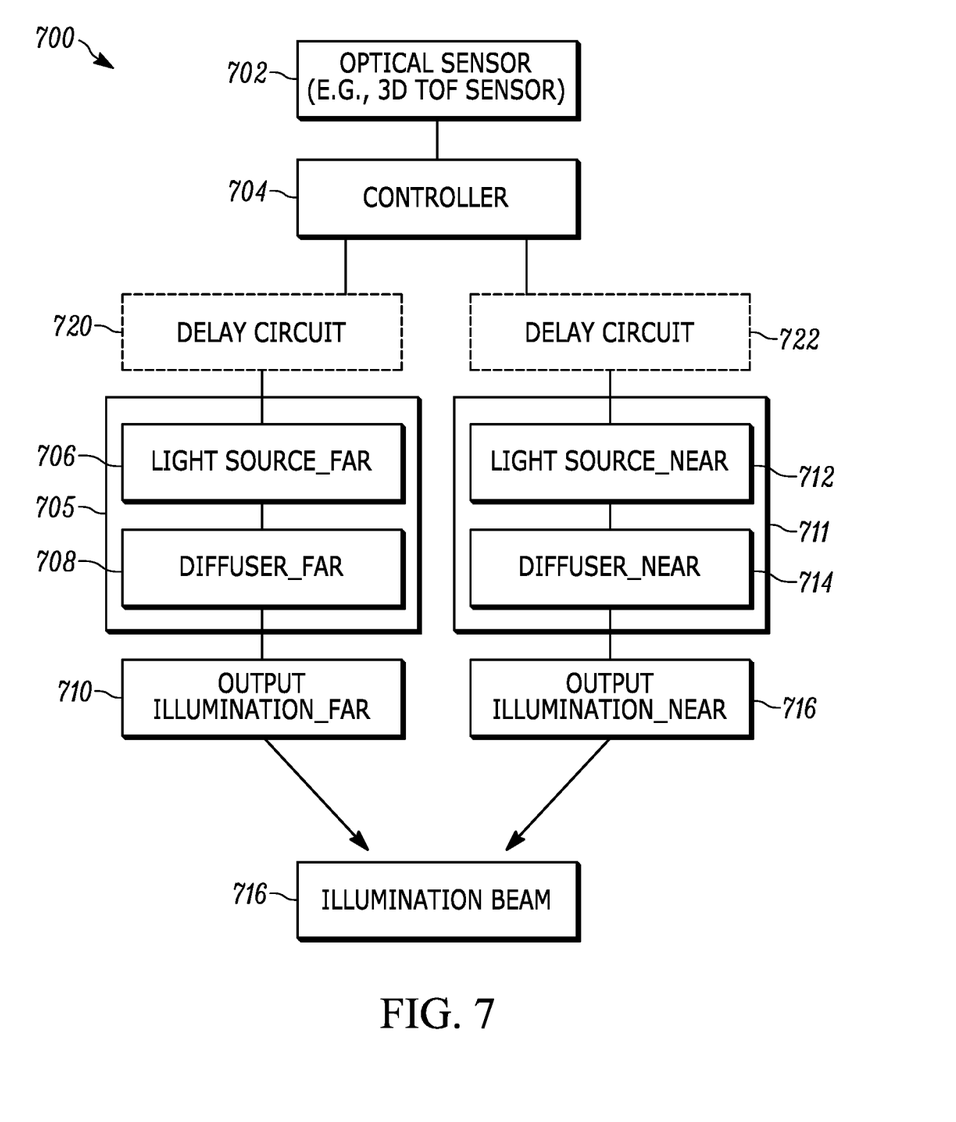
FIG. 7 illustrates a control diagram of a process for illuminating a volume using dual control of the far field illumination system and the near field illumination system of FIG. 3, in accordance with some embodiments.
Figure 8:
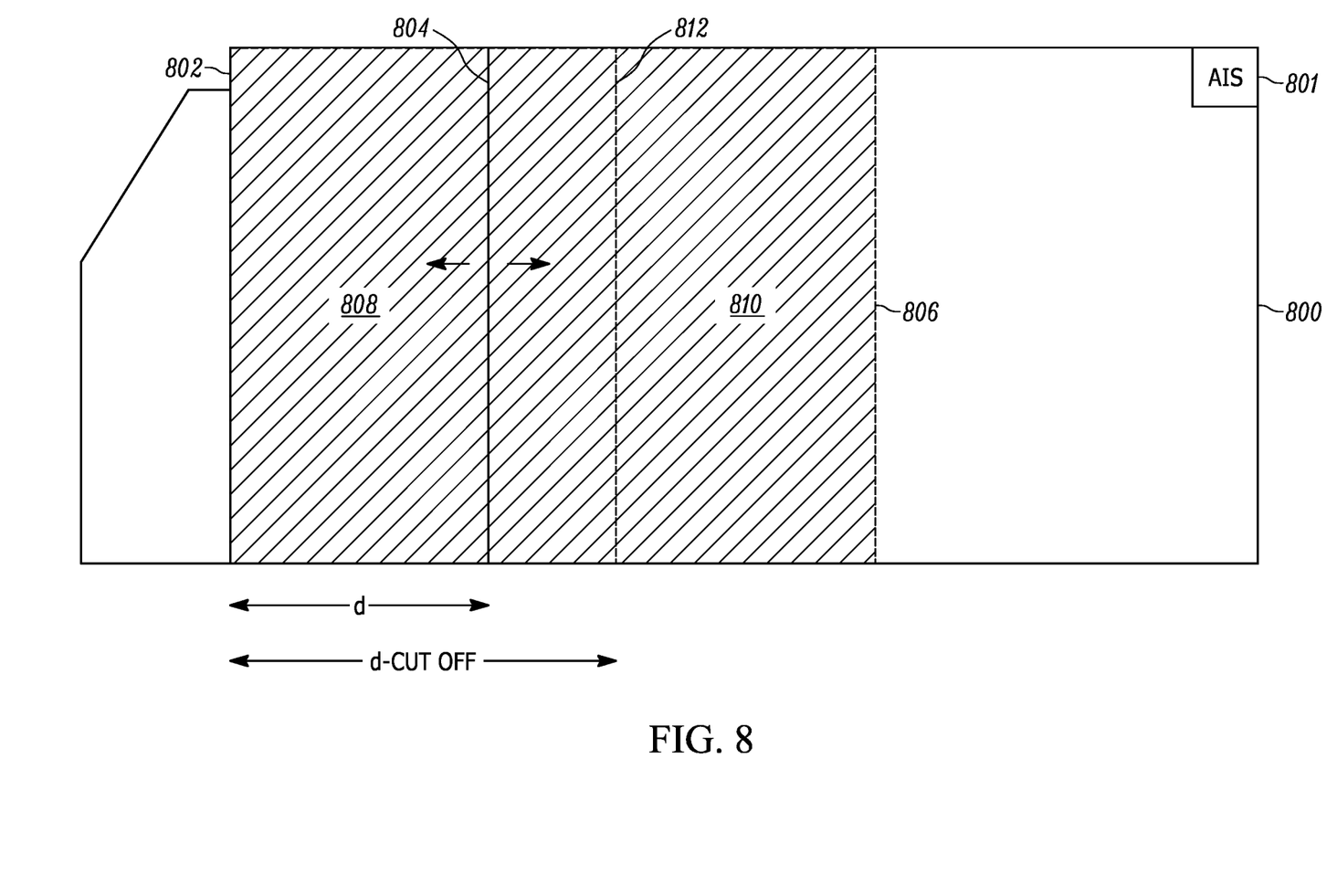
FIG. 8 is a side view of vehicle trailer with an adaptive illumination system, in accordance with some embodiments.

FIG. 7 illustrates an example control schematic 700 illustrating a process control flow for adaptively illuminating a volume for sensor measurements. An optical sensor 702, e.g., a 3D TOF sensor, is positioned at a proximal end of a volume to measure loads placed within that volume, such as the load 609 in FIG. 6. In some implementations, the 3D TOF sensor 702 determines a position of a distal back wall a vehicle trailer. The 3D TOF sensor 702 further identifies the nearest load within the volume and determines an interstitial plane, as well as the distance between that interstitial plane and the back wall. While the sensor 302 is described as a 3D TOF sensor, in other examples, an auto-exposure sensor, as described herein, may be used. FIG. 8 is a side view of an example vehicle trailer 800, having a back wall 802 and an interstitial plane 804 a distance, d, from that back wall 802, and an adaptive illumination system 801 configured to perform the operations of process environment 700. As more load is added to the vehicle trailer 800, the interstitial plane 804 moves further away from the back wall.

A controller 704 receives back wall data and interstitial plane data from the optical sensor 702 and controls input signals to each of a plurality of illumination sources illuminating an illumination volume 806 within the vehicle trailer 800. In some embodiments, a first illumination source 705 includes a far field light source 706 and a far field diffuser 708. The far field light source and diffuser pair 705 produce an output 710 configured to primarily illuminate a far field region 808 of the illumination volume 806. Similarly, a second illumination source 711 includes a near field light source 712 and a near field diffuser 714 producing an output 716 configured to primarily illuminate a near field region 810 of the illumination volume 806. Combined, the outputs 710 and 716 provide an illumination beam 718 into the illumination volume 806 to satisfy one or more irradiance conditions (i.e., illumination pattern criteria).

The controller 704 sends power control signals to each of the light sources 706 and 712. In response to the position data identifying the interstitial plane 804, the controller 704 adaptively adjusts those power control signals to maintain desired irradiance conditions within the volume 806. For example, as the interstitial plane moves further away from the distal end wall 802, the controller 704 reduces the power in the far field light source 706 by sending a lower voltage power control signal to the source 706, while maintaining the voltage level of a power control signal sent to the near field light source 712. If the interstitial plane 804 moves closer to the distal back wall 802, e.g., if load is removed from the vehicle trailer 800, then the controller 704 may ramp up the voltage on the power control signal to the source 706.

In some implementations, the controller 704 determines the levels for the power control signals for each of the illumination pairs 705 and 711 by accessing a database of interstitial plane distance values and corresponding power control signal values. An example database is a lookup table. In some implementations, that database identifies a cut-off distance 812, d_cutoff, at which point the far field illumination source 705 no longer produces an illumination output. The power control signal values stored in the database may be dependent upon the volumetric size of the vehicle trailer, one or more of the dimensions of the vehicle trailer, the expected reflectance properties of the loads to be put in the vehicle trailer, the type of light sources, and the type of diffusers such as the illumination patterns generated by the diffusers. In some implementations, the database may be populated during a set-up mode, in which the 3D TOF sensor measures irradiance at different locations in the vehicle trailer using one or more reference object. The reference object may be an example package, a reflector, or other object. A user may put the reference object at different locations, while the controller 704 controls the illumination sources 705 and 711 to illuminate the volume in combination. The optical sensor 702 then reads time-of-flight data on the reference object, supplying the data to the controller 704 which may then determine an optimal power control signal value for each of the illumination sources, in response to that optical data.

In some example implementations, the light from each illumination source 705 and 711 is to be modulated. In such implementations, an optional far field delay circuit modulator 720 may be electrically or optically coupled to the illumination source 705 and an optional near field delay circuit modulator 722 may be coupled to the illumination source 711. The optional circuits 720 and 722 may be used, for example, in implementations in which a 3D TOF sensor determines the position (e.g., the distance from the an end wall) of an interstitial plane using a high frequency modulation of the one or both of the far field and near field illumination pairs. In the illustrated implementation, the pairs 705 and 711 are coupled to the controller 704 in parallel and the delay circuit 722 and 722 synchronize a phase between the pairs. To facilitate this operation, the controller 704 sends modulation control signal to control operation of the delay circuits 720 and 722. In other example implementations, the pairs 705 and 711 may be coupled to the controller 704 in series, and the controller is configured to send modulation control signals in an addressable manner to affect high frequency modulation operation of the 3D TOF process.

Figure 9:
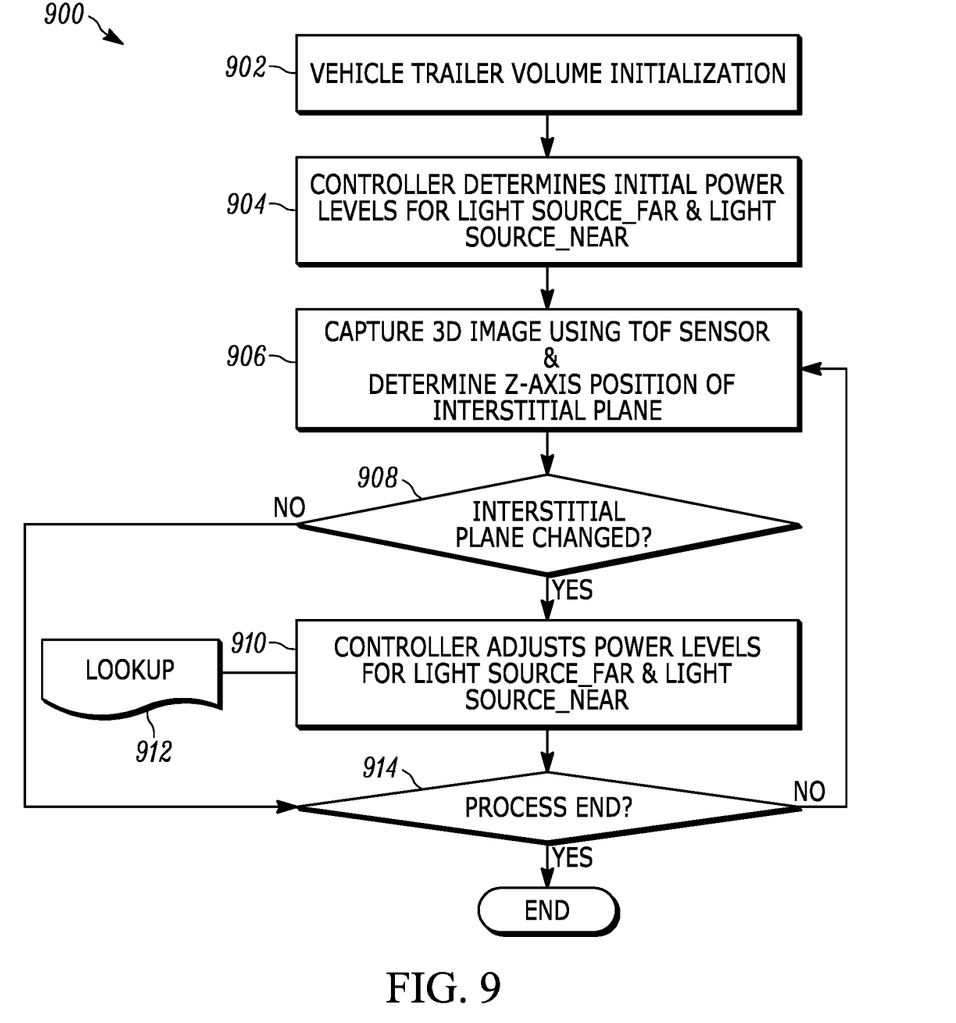
FIG. 9 illustrates a process for illuminating a volume using dual control of the far field illumination system and the near field illumination system of FIG. 3, in accordance with some embodiments.

FIG. 9 illustrates an example process 900 of adaptive illumination of a vehicle trailer. A vehicle trailer volume initialization operation 902 is performed to determine characters of vehicle trailer, e.g., a distance of a distal end plane (back wall) thereof. A controller operation 904 determines initial power levels for a far field illumination source (or far field illumination source and diffuser pair) and for a near field illumination source (or near field illumination source and diffuser pair). A 3D TOF image capture operation 906 is performed and determines the distance (e.g., along a z-axis) of an interstitial plane, e.g., the nearest plane corresponding to loaded packages in the vehicle trailer. That position may be determined as the distance from the distal plane (end wall). The operation 906 may continually or periodically determine the position of the interstitial plane, and an operation 908 determines if the interstitial plane has changed. If so, a controller operation 910 determines adjustments to the power levels for the near field illumination source and the far field illumination, for example, by accessing a database of stored power levels, e.g., a lookup table 912. An operation 914 then determines if the process 900 is to end or not, for example, by applying a time out procedure if the interstitial plane is not moved for a given amount of time or using some other determinant. It is noted that in some examples, the operation 906 may be replaced with an auto-exposure operation in which a sensor continuously auto-adjusts a shutter speed or aperture size to maintain exposure until a threshold auto-exposure condition is met, where that threshold has been determined to correspond to an interstitial plane being at a distal position at which an adjustment is to be made by the controller to the output levels of one or more of the near field and far field pairs.

While not shown, in various embodiments, multiple light sources may be used to illuminate the desired illumination volume of a vehicle trailer. For example, a light source may include two laser emitters, each having a different diffuser, where one laser emitter-diffuser pair may produce a first shape factor, $k_1$, illumination pattern and a different laser emitter-diffuser pair may produce a second shape factor, $k_2$, illumination pattern, where $k_1 \neq k_2$, where $k_1 > k_2$ or where $k_1 < k_2$, for example. A processor within the illumination system would then determine which laser emitter-diffusion pair is used to produce the desired illumination volume. Or, in other example embodiments, the processor may be programed to control each of the pairs to fill different portions of the illumination volume, such that the entire volume is filled from combining the output beam from each. In some embodiments, one pair is used to illuminate a back wall to satisfy a desired first illumination criterion, while the other pair is used to illuminate an interstitial plane to satisfy a desired second illumination criterion. In some embodiments both pairs may be used to illuminate a back wall, and only one of the pairs is used to illuminate an interstitial plane.

The present techniques provide example systems and methods for an illumination system that produces an illumination intensity pattern that can minimize the number of light sources needed for long distance, e.g., 10 m to 20 m, 3D time-of-flight applications, including the 24 ft to 53 ft vehicle trailer length size common in vehicle shipping applications. The techniques herein may be implemented in trailer monitoring units have time-of-flight 3D sensors, although they are not limited to such applications, but rather may be used in any number of applications in which illumination criteria for a illumination volume are to be maintained.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description of the Invention, with each claim standing on its own as a separately claimed subject matter.

What is claimed is:

1. An illumination system comprising:
   a plurality of light source and diffuser pairs, wherein each of the plurality of pairs is configured to be positioned at a proximal end of a vehicle trailer volume, wherein each of the plurality of pairs is configured to generate a respective diffused photon beam, and wherein each pair comprises a respective electrically controllable light source and a respective diffuser,
   wherein the plurality of pairs are configured to collectively illuminate an illumination volume extending from a distal end plane of the vehicle trailer volume to an interstitial plane in the vehicle trailer volume,
   wherein at least one of the plurality of pairs is a far field light source and diffuser pair configured to produce a far field output beam and wherein at least one of the plurality of pairs is a near field light source and diffuser pair configured to produce a near field output beam; and
   a controller electrically connected to the far field light source and diffuser pair and to the near field light source and diffuser pair and configured to adjust output illumination intensity levels of one or both of the fair field light source and diffuser pair and the near field light source and diffuser pair in response to changes in position of the interstitial plane.

2. The illumination system of claim 1, wherein the near field light source and diffuser pair comprises a diffuser configured to maintain an output illumination intensity according to $I(\theta) \leq Io*\cos(\theta)$, where $\theta$ is an angle from an illumination axis of the output beam, and where Io is the illumination intensity on the illumination axis.

3. The illumination system of claim 2, wherein the far field light source and diffuser pair comprises a diffuser configured to maintain a uniform output illumination intensity for producing a uniform irradiation across a lateral extent of the distal end plane.

4. The illumination system of claim 1, wherein the controller is configured to reduce the output illumination intensity level of the far field light source and diffuser pair in response to the interstitial plane moving further away from the distal plane.

5. The illumination system of claim 1, further comprising an imager and a time of flight controller electrically coupled to the imager and configured to determine the position of the interstitial plane as a position of a nearest proximal object within the vehicle trailer volume.

6. The illumination system of claim 1, wherein the controller is configured to receive the position of the interstitial plane from the time of flight controller and based on the position determine the output illumination intensity levels of one or both of the far field light source and diffuser pair and the near field light source and diffuser pair.

7. The illumination system of claim 1, wherein the plurality of pairs comprises the far field light source and diffuser pair and the near field light source and diffuser pair, and wherein the controller is configured to control output illumination intensity levels of both the far field light source and diffuser pair and the near field light source and diffuser pair such that irradiance in the illumination volume, $I(\theta)$, is expressed as $I(\theta) \leq Imax(\theta) = Io*\cos(\theta)$, where $\theta$ is an angle from an illumination axis, and where Io is an illumination intensity on the illumination axis resulting from a combination of the far field output beam and the near field output beam.

8. The illumination system of claim 1, further comprising a 3 dimensional (3D) Time-Of-Flight (TOF) sensor configured to determine at a position of the interstitial plane in the vehicle trailer volume.

9. The illumination system of claim 8, the 3D TOF sensor is configured to determine the position of the interstitial plane using a high frequency modulation of the plurality of pairs.

10. The illumination system of claim 9, wherein each of the plurality of pairs is coupled to the controller in series, and wherein the controller is configured to control each of the plurality of pairs using a high frequency modulation control signal supplied to each of the plurality of pairs.

11. The illumination system of claim 9, wherein each of the plurality of pairs is coupled to the controller in parallel and wherein each of the plurality of pairs comprises a delay circuit configured to synchronize a phase for each of the plurality of pairs, and wherein the controller is configured to control each of the plurality of pairs using a high frequency modulation control signal supplied to each of the plurality of pairs.

12. The illumination system of claim 1, further comprising an auto-exposure optical sensor configured to determine when a threshold auto-exposure condition is satisfied corresponding to the interstitial plane in the vehicle trailer volume.

13. The illumination system of claim 1, wherein the controller is configured to adjust output illumination intensity levels by controlling a laser source drive signal for each of the fair field light source and diffuser pair and the near field light source and diffuser pair.

14. An illumination system comprising:
   a light source positioned at a proximal end of a vehicle trailer volume and configured to emit a photon beam;
   an electrically controllable diffuser positioned to receive the photon beam and to diffuse the photon beam into an output beam to fill an illumination volume within the vehicle trailer volume, the illumination volume extending from the distal end plane to an interstitial plane between the distal end plane and a proximal end plane of the vehicle trailer volume; and
   a controller electrically connected to the electrically controllable diffuser and configured to adjust a diffusion pattern to control an output illumination intensity pattern of the output beam, where the controller is configured to adjust the diffusion pattern in response to changes in position of the interstitial plane.

* * * * *